July 8, 1958

E. H. PETRIE 2,842,311

CONTROL APPARATUS

Filed March 24, 1955

INVENTOR.
EDGAR H. PETRIE
BY Arthur H. Swanson
ATTORNEY.

July 8, 1958 E. H. PETRIE 2,842,311
CONTROL APPARATUS
Filed March 24, 1955 8 Sheets-Sheet 2

INVENTOR.
EDGAR H. PETRIE
BY Arthur H. Swanson
ATTORNEY.

E. H. PETRIE 2,842,311

CONTROL APPARATUS

Filed March 24, 1955

INVENTOR.
EDGAR H. PETRIE

BY Arthur H. Swanson

ATTORNEY.

INVENTOR.
EDGAR H. PETRIE
BY Arthur H. Swanson
ATTORNEY.

United States Patent Office 2,842,311
Patented July 8, 1958

2,842,311

CONTROL APPARATUS

Edgar H. Petrie, Levittown, Pa., assignor to Minneapolis-Honeywell Regulator Company, Minneapolis, Minn., a corporation of Delaware Application March 24, 1955, Serial No. 496,437

35 Claims. (Cl. 235—61)

A general object of the present invention is to provide a new and improved control apparatus useful in regulating the magnitude of a process variable. More specifically, the present invention is concerned with improvements in apparatus for regulating the magnitude of a process variable and incorporating circuitry operable to predict the future conditions and demands of the process so that the required input and changes in input to the process may be made at the optimum times to insure the best process operating conditions.

The optimum in process variable control may be characterized by a controller which will maintain the process variable at its desired set point under all conditions which normally tend to upset the process. There are practical physical limitations in the building of a controller for a process which make it difficult to attain this optimum. As a compromise a controller may be so constructed as to return the measured variable to its desired set point value upon deviation therefrom in a minimum of time without the introduction of any instability into the controlled process. The quickest way to return a process variable to its set point when the variable is below the set point is to apply the maximum input to the process. However, if maximum input is applied until the process variable reaches the set point, the inertia or stored energy of the process will tend to carry the measured variable beyond the set point to introduce undesirable overshooting of the measured variable. To eliminate this, as the variable approaches the desired set point, the process must be braked. A convenient way to brake the process is by applying the opposite extreme input to the process. Finally, as the process variable approaches the desired set point, the variable may be leveled off at the set point by applying the correct input to the process, namely that input which will take care of any losses from the process.

It is, therefore, a further object of the invention to provide an improved process variable controller which is characterized by its ability to return the process variable to the desired set point in a minimum of time without undesirable overshooting of the variable.

The attainment of the foregoing object has been achieved in a practical embodiment of the present invention by the use of computer circuitry which is operable to predict the future trends of the process and thereby calls for preselected inputs to the process at the optimum times. By proper selection of computer circuit parameters it is possible to achieve minimum return time of the variable to the set point with a minimum of overshoot in the process. To that end, the present invention contemplates the use of computer or predicting analogs of the process in which the time constants of the analogs are a fraction of that of the time constants of the process so that it is possible to make a number of computations or predictions to determine when the process input should be changed and to what value the input should be changed to achieve the optimum of control.

A still further object of the invention, therefore, is to provide an improved predicting type of controller using analogs of the process for determining the optimum operating conditions necessary for accurate and stable operation.

Another object of the invention is to provide an improved predicting controller using a plurality of predicting analogs of the process with means for applying simulated process input signals to the process analogs.

Still another object of the invention is to provide a predicting controller incorporating a master analog of the process and a plurality of computer analogs of the process which are periodically reset to the master analog.

A further object of the present invention is to provide a controller which will predict the trends of the controlled process and supply to the process control input signals calling for maximum input, minimum input, or the correct value of input for holding the measured variable at a selected set point value.

The various features of novelty which characterize the invention are pointed out with particularity in the claims annexed hereto and forming a part of this specification. For a better understanding of the invention, its advantages, and specific objects attained with its use, reference should be had to the accompanying drawings and descriptive matter in which there is illustrated and described preferred embodiments of the invention.

Figure 5:
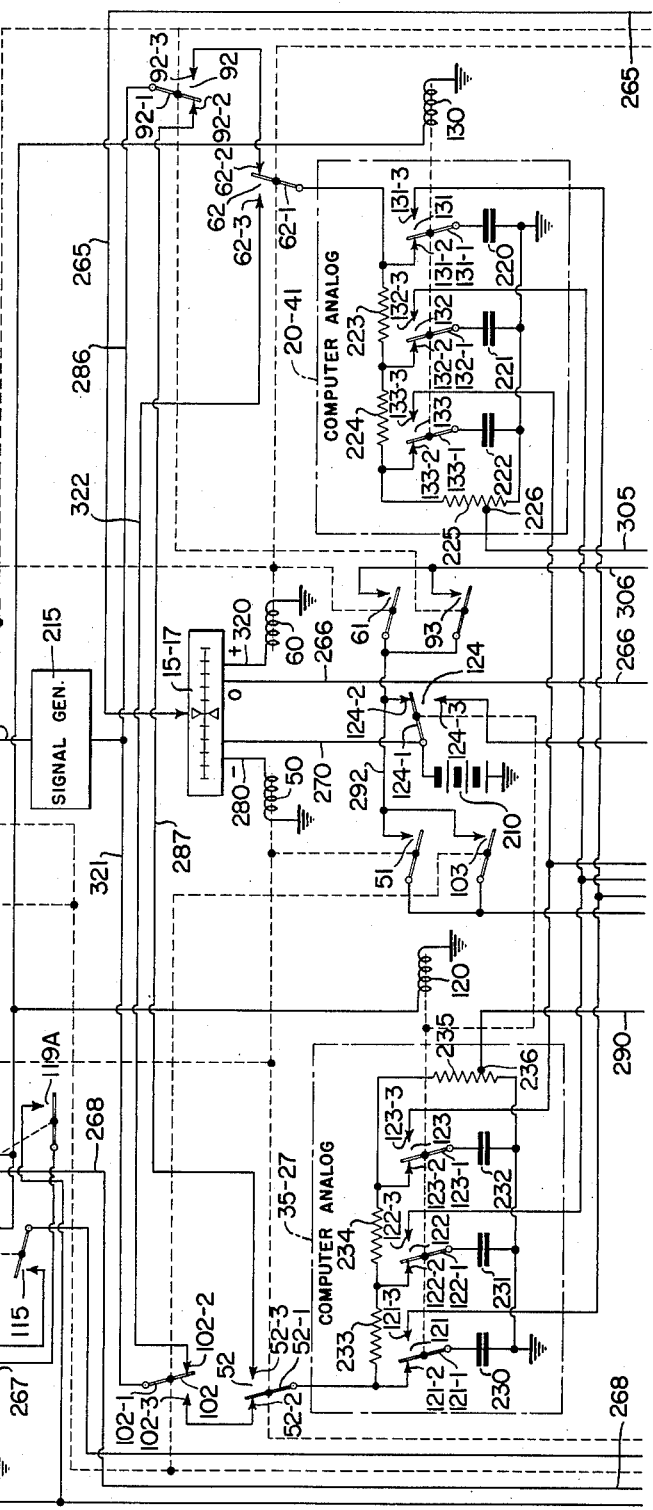
Figure 7:
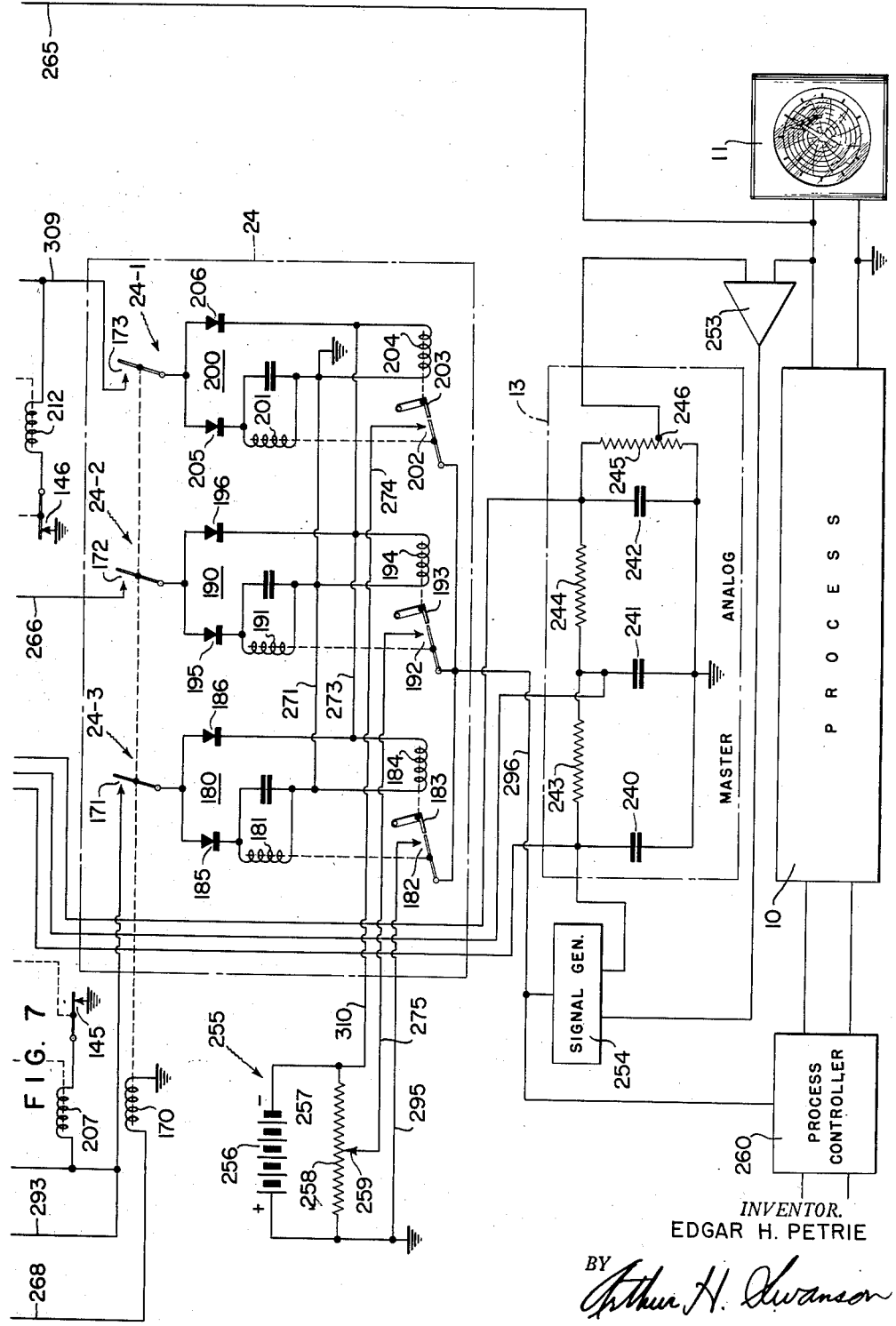

Figs. 5, 6, and 7 are a composite showing of the overall circuit wiring diagram for the controller;

Fig. 5A shows the manner in which Figs. 5, 6, and 7 should be put together to complete the electrical circuit.

Figure 8:
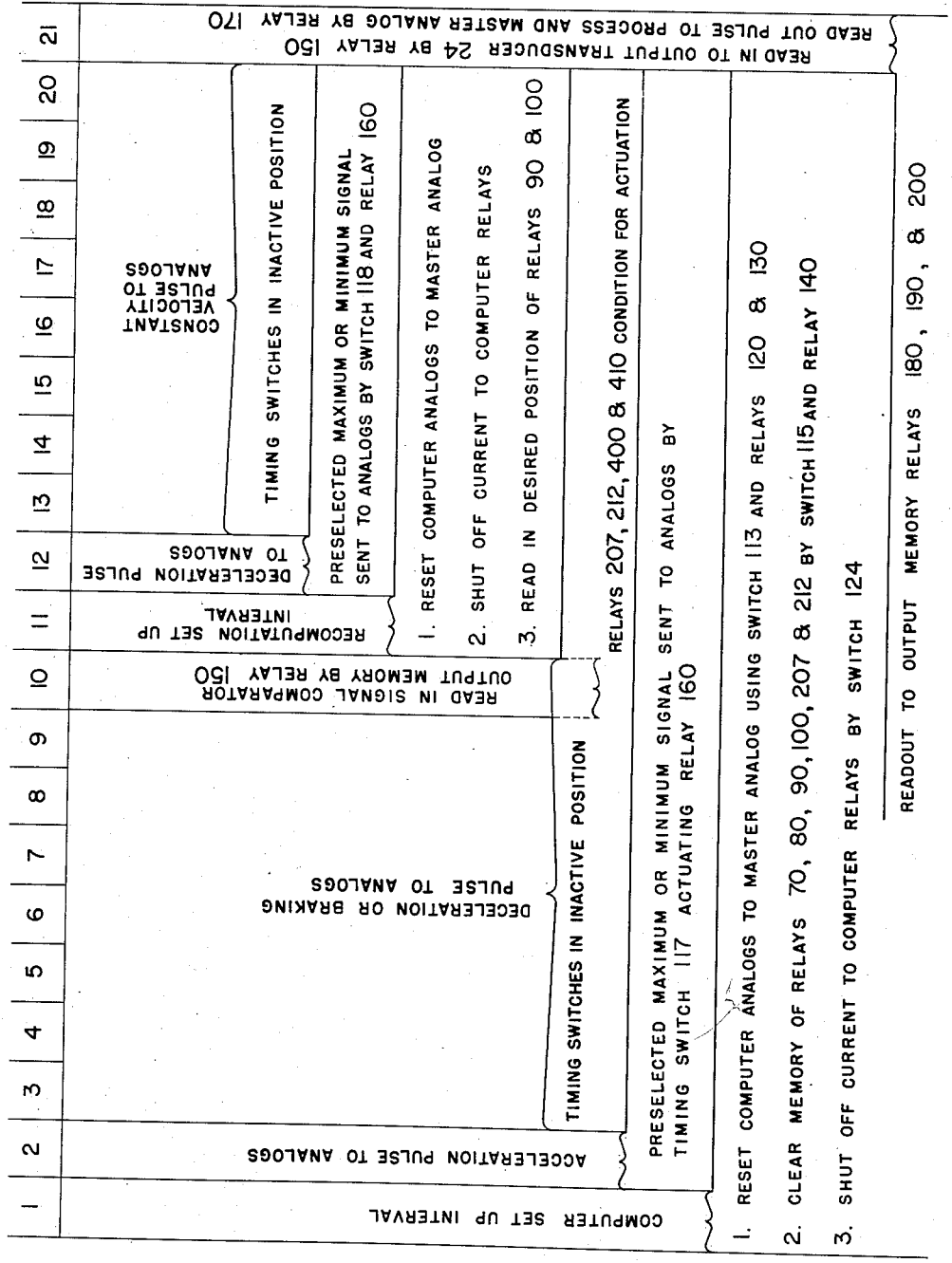

Fig. 8 shows the relay timing sequence for the relays shown in the complete wiring diagram of Figs. 5, 6, and 7.

Figure 1:
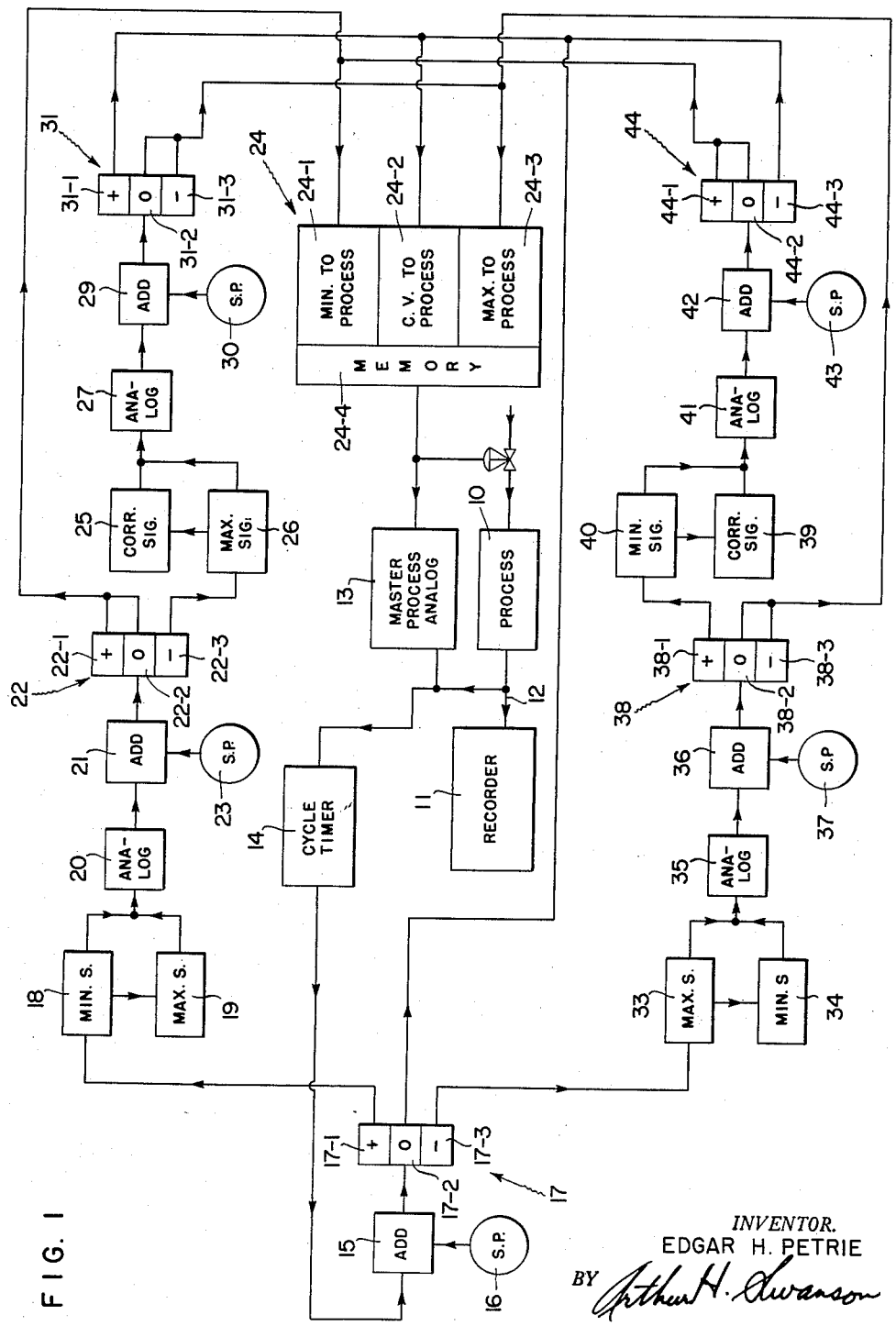
Fig. 1 shows a block diagram of the signal channels used in the present predicting controller.

Referring first to Fig. 1, the numeral 10 represents a process which is to be controlled by the apparatus embodiment of the present invention. This process has a variable the magnitude of which is to be measured and controlled and which may well be a temperature, pressure, or the like. The magnitude of the measured variable from the process is arranged to be indicated and recorded by a suitable recorder 11, the latter of which is connected to the process by means of a connector 12.

Operating in parallel with the process 10 is a master process analog 13. As will be explained below, this analog may well take the form of any analog circuitry which will be a substantial electrical duplicate in time constant and in the other process parameters of the process 10. The master process analog 13 in the appartus embodiment of the invention illustrated is operative to produce an output electrical signal which corresponds at all times to the magnitude of the process condition being measured and controlled. One form which the analog 13 desirably may take is illustrated in Fig. 7. The output of the process 10 is fed through a timing mechanism 14 into a signal comparator 15. The signal comparator 15 may well take the form of any conventional signal comparison circuit which will produce an output indicative of the difference between a pair of input signals. The other input to the comparator 15 is a set point input source 16 which may be in the form of a mechanical adjustment or an electrical signal. The output of the comparator 15 is by way of a switching block 17 having three output sections 17–1, 17–2, and 17–3, which sections include switching means and are respectively actuated upon a plus deviation, zero deviation, and minus deviation in the process from the set point.

Actuated by a signal originating from the plus channel 17–1 are a pair of signal generators 18 and 19. These signal generators are adapted to apply to the input of a process analog 20 a signal representative of a process input signal. The analog 20 may be termed a computer or a predictor analog whose time constant is substantially less than that of the master analog 13 or the process and whose damping ratios are similar.

The output of the analog 20 is fed to a second signal comparator 21 which also has a set point input 23. The output of this comparator goes through another switching block 22 having a plus section 22–1, zero section 22–2, and a minus section 22–3.

The output of the switching block 22 may go either directly to an output transducer 24 or to a further computing channel which includes signal generators 25 and 26 which feed a further analog 27 which is preferably characterized the same as the analog 20. The output of this analog feeds a further set point signal comparator 29 having a set point input source 30. The comparator 29 feeds a switching block 31 which includes a plus section 31–1, a zero section 31–2, and a minus section 31–3.

The output of the switching block 31 also feeds control signals to the output transducer 24. This output transducer 24 includes a minimum signal to process section 24–1, a correct value signal to process section 24–2, and a maximum signal to process section 24–3. Each of these latter sections in turn acts through a memory circuit 24–4 which retains the input to the process at a selected value for a predetermined time.

Also connected to the output transducer 24 is the zero section 17–2 of the switching block 17. This latter connection may be dispensed with in certain control applications.

The minus section 17–3 of the switching block 17 controls a further pair of process signal generators 33 and 34. These generators in turn supply input signals to a predicting analog 35 which corresponds to the above analogs 20 and 27. The output of the analog 35 feeds into a signal comparator 36 which has a set point input source 37. The output of the signal comparator 36 is applied to a switching block 38 having a plus deviation section 38–1, a zero deviation section 38–2, and a minus deviation section 38–3. The zero and minus deviation sections 38–2 and 38–3 are connected directly to the output transducer 24. The plus deviation section 38–1 is effective in controlling the operation of a further pair of generators 39 and 40, the latter of which supply predetermined input signals to a further analog 41. The analog 41 has its output connected to a further signal comparator 42, the latter of which has an input set point at 43. The output of the comparator is by way of a switching block 44, the latter of which is provided with a plus deviation section 44–1, a zero deviation section 44–2, and a minus deviation section 44–3. These latter sections are all connected to the output transducer 24.

As is explained more in detail hereinafter, the signal levels or datum points about which the analogs 20, 27, 35 and 41 are adapted to operate are adjustable during selected intervals in accordance with operating conditions within the master analog 13.

*Operation of Figure 1*

In considering the operation of Fig. 1, it should first be recognized that while separate blocks have been shown for the numerous functions of the apparatus, many of these blocks may be combined as will be apparent upon considering the complete wiring diagram of this system. For simplicity in considering the basic principles of operation of the present invention, these various functions have been separated into separate sections.

The general circuit functioning is best introduced by by considering in tabular form the steps taken in putting out a control signal.

(1) Subtract set point source 16 from the process variable from process 10.
   1.1 If result is positive put minimum signal into analog 20 for one interval of the prediction period, then put in maximum signal for the rest of the prediction period.
      1.11 Subtract set point 32 from analog 20 output.
         1.111 If result is positive or zero, put minimum signal to process.
         1.112 If result is negative, put maximum signal into analog 27 for one interval and then correct value for the rest of the prediction period.
      1.12 Subtract set point 30 from analog 27 output.
         1.121 If result is positive, put correct value signal into the process.
         1.122 If result is negative or zero, put the maximum value signal into the process.
   1.2 If result is zero, put correct value into the process (this step may be omitted).
   1.3 If result is negative, put maximum signal into analog 35 for one interval, then put in minimum signal for the rest of the prediction period.
      1.31 Subtract set point 37 from analog 35 output.
         1.311 If result is negative, or zero, put maximum signal into the process.
         1.312 If result is positive, put minimum signal into analog 41 for one interval, then correct value signal for the remainder of prediction period.
      1.32 Subtract set point 43 from analog 41 output.
         1.321 If result is positive or zero, put minimum signal into the process.
         1.322 If result is negative put correct value signal into process.

(2) Repeat 1.

The controller continuously goes through cycles, such as 1, each cycle is equivalent in time to zero, one, or two prediction periods, depending on how many analogs must be used before the answer to the question of the desired input is found.

The diagram of Fig. 1 will now be considered in more detail.

In the apparatus arrangement illustrated, the output signal of the process analog 10 is periodically applied through the cycle timer 14 to the signal comparator 15. If the set point signal of the source 16 is equal to the signal from the process, the resultant zero deviation signal is effective to actuate a switch operating in the zero section 17–2 of the switching block 17. This will produce a control signal which will be fed to the control section 24–2 of the output transducer 24. The control section 24–2 is effective to produce an input of correct value to the process which will hold the process at the desired present condition. In other words, the input to the process will be that input necessary to supply the losses from the process. As long as the measured variable corresponds to the set point signal, there will be no deviation in the controlling action thus far explained.

If the measured variable of the process should become larger than the set point value, there will be an output switching action through the section 17–1 of the switching block 17 and this section will initiate the operation of the generators 18 and 19 which will produce simulated process input signals on the input of the analog 20.

Figure 2:
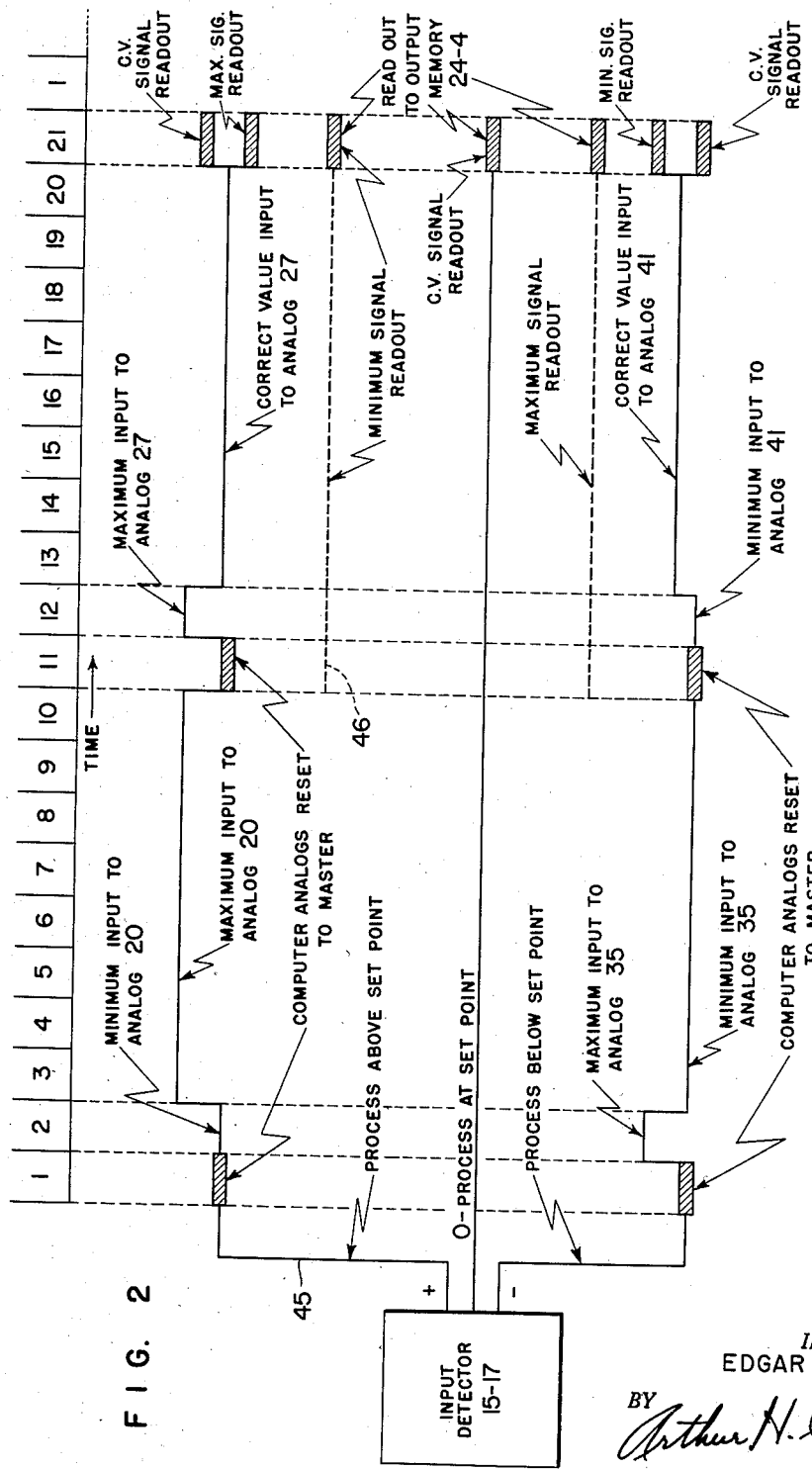
Fig. 2 is a chart showing the timing sequences and the input signals to the computer analogs.

The timing sequence for the computer analogs is shown in Fig. 2 in which a representative computer period is broken down into twenty-one separate intervals. With the process above the set point, the path 45 will be taken. In following this path through the timing sequence, it will be noted that during the first interval the datum points about which the computer analogs operate are reset to the master analog. This step insures that at the start of each predicting period the computer analogs will be in step with the master. This will be discussed more fully below.

After the computers have been reset to the master analog, a first input pulse is applied to the analog 20. This pulse is termed an acceleration pulse. The acceleration pulse takes place during the second interval and may be adjusted to be a fractional part of that interval in accordance with the demands of the particular process. As shown, during interval 2, the acceleration pulse is a minimum input pulse to the analog 20 followed by a deceleration pulse in the form of a signal which is a maximum input to the analog 20. This deceleration pulse or maximum input pulse is applied during intervals 3 through 10.

During interval 11, the output of the analog 20 is compared in the signal comparator 21 with the set point source 23. If the analog output indicated by the comparator 21 actuates the plus section 22–1 or the zero section 22–2 of the switch block 22, there will be an output signal fed directly to the output transducer section 24–1, that termed the minimum signal to process section. This is shown by the connecting line 46 in Fig. 2. It will be seen that at the end of interval 20 and during interval 21 there will be a readout of the input signals to the output transducer 24 and the memory section 24–4 will hold the readout signal until the next cycle has been completed. This feature will likewise be considered in greater detail below.

If the output from the signal comparator 21 indicates that the measured variable is below the set point source 23, there will be an output signal through the section 22–3 to the signal generator sections 25 and 26. These signal generators also are operative to produce simulated process input signals on the input of analog 27. Referring to Fig. 2 again, it will be seen that after the analogs have been reset during interval 11, a maximum input signal or deceleration signal is applied to analog 27 during interval 12. Following this, during intervals 13 through 20, the correct value input or a constant velocity signal is fed into analog 27. The output of the analog 27 is then read by means of the signal comparator 29 which compares the analog signal with the set point 30. If the signal is above the set point the plus section 31–1 is actuated and a signal will be applied again to the output transducer section 24–2 so that during interval 21 there will be a readout to the memory section 24–4 and the correct value of input will be applied to the process 10 and to the master process analog 13.

If the output from the signal comparator 29 actuates either the switching section 31–2 or 31–3, the output transducer section 24–3 will be actuated so that upon readout to the memory section 24–4 during the interval 21 a maximum signal will be supplied to the process 10 and the master process analog 13. The output signal from the output transducer 24 which is read into the memory section 24–4 will be retained throughout the next cycle until the next readout takes place.

If the measured variable of the process 10 is below the set point signal from the source 16, there will be an output from the switching block 17 in the section 17–3. This will effect the energization of the signal generators 33 and 34 and these generators will apply an input signal to the analog 35. The input signals to the analog 35 will be simulated process input signals which are shown in their time sequence in Fig. 2. As before, during interval 1, the computer analogs are reset with the master analog. During interval 2, an acceleration pulse is applied to the analog 35 from the signal generator section 33. This will be a maximum input signal. During intervals 3 through 10, a braking pulse or deceleration pulse is applied to the input of the analog 35 and this pulse constitutes a minimum input signal to the analog 35. At the end of interval 10, the output signal of the signal comparator 36 on the switching block 38 is read out and if the measured variable is below the set point signal, the section 38–3 of the switching block 38 will be effective to apply an input signal to the output transducer section 24–3. This latter section is the maximum input to the process section and the memory for that section will be actuated as soon as the computing cycle has proceeded to interval 21 at which time the signal on the controller is read into the memory section 24–4.

If the measured variable from the output of the analog 35 is greater than the set point signal source 37, the signal comparator 36 will be effective to actuate section 38–1 on the switching block 38. This will render the signal generator sections 39 and 40 effective to apply input signals to the analog 41. The input signals in this instance will be the signals represented in the lower section of Fig. 2 with a minimum input signal being applied to the analog 41 during interval 12 and a correct value signal being applied to the analog 41 during intervals 13 through 20. During interval 21, the analog output is compared with the set point source 43 and the signal comparator 42 and the switching block 44 will be effective in one of its sections to produce an output signal. With the analog output less than the set point value, the section 44–3 is effective to apply an input pulse to the output transducer section 24–2 which produces a correct value signal on the input to the process.

If the analog 41 has an output signal which is greater than or equal to the set point signal source 43, the signal comparator 42 will produce an output which will actuate either sections 44–1 or 44–2. In either event, the switching sections 44–1 or 44–2 will be effective to apply a control signal to the output transducer section 24–1 which will supply minimum to the process. During interval 21, the output memory section 24–4 will pick up the input signals from the activated output transducer section and will supply the appropriate signal to the master process analog and to the process during the following cycle until a further readout is made. This operation is continued in a cyclic manner.

Figure 3:
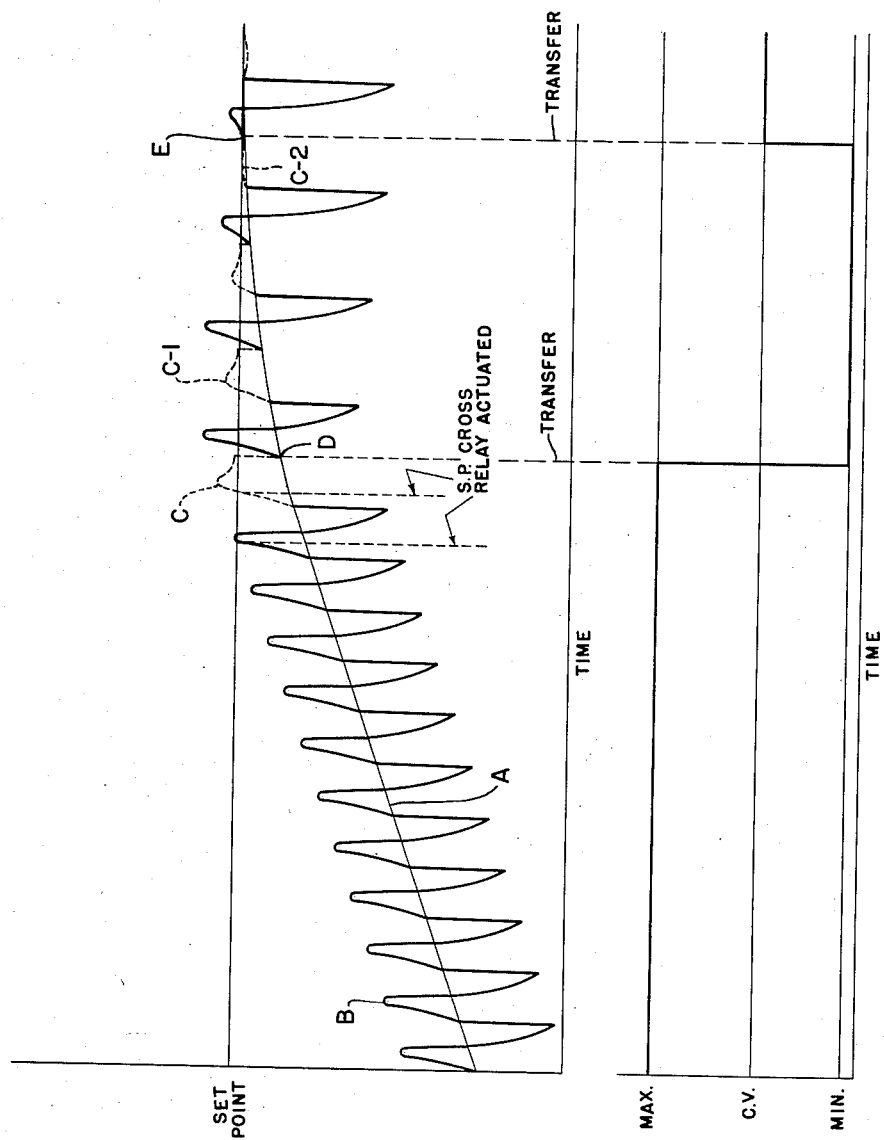
Fig. 3 is a representative showing of the curves of the process variable and the computer analogs coming up to the set point from a point below the set point.

The operation of Fig. 1 may be further understood by considering Fig. 3 which shows a representative set of curves indicating the manner in which the controller is operative to bring the measured variable up to the desired set point. The curve A represents the measured variable. The curves B represent the output signals of the analog 35. The dotted curve C represents the output signal from the analog 41. It will be noted that the curves B are superimposed upon the process variable curve A. Similarly, the curves C are superimposed upon the curve A. In order to get the measured variable to the set point in the quickest possible time, a maximum input signal is applied to the process. The maximum input signal is put into the process as a result of the operation of the signal comparator 15, signal generators 33 and 34, analog 35, signal comparator 36, and switching block 38 which connects by way of the minus channel 38–3 to the maximum to process section 24–3 of the output transducer 24. Inasmuch as the measured variable will remain below the set point during the initial part of the start up, the output memory 32 will then continuously apply maximum input to the process. At the start of each computing cycle, the analogs 35 and 41 are reset to the measured variable so that the level or datum points of the analogs will conform to the value of the measured process variable. The simulated process signals derived from the signal generators 33 and 34 are applied to the input of the analog 35 and are effective about the datum point or level established in that analog. Similarly, the output signals derived from the generators 39 and 40 are applied to the input of the analog 41 and are effective about the datum point therein established.

The curve B will have an initial upward slope due to the application of a maximum input signal to the analog 35, said maximum input signal being the acceleration pulse. Following the maximum input signal acceleration pulse, there is a minimum input signal or deceleration signal applied and this causes the output of the analog to decrease so that it crosses below the measured variable line A. Upon the occurrence of interval 11, the analog 35 is again reset to the master process analog 13. During the next half of the computing period the analog 35 will again have an input signal applied thereto in the form of a maximum acceleration pulse initially, and a minimum signal deceleration pulse during the rest of the period. At the instant of interval 21, the output condition of the signal comparator 36 by way of switching block 38 indicates that the output transducer is still calling for maximum input to the process. The output memory section 24–4 will hold this information and continue to supply a maximum input to the process 10 and the master process analog 13. In passing through intervals 1 through 21, as explained by reference to Fig. 2, the curve B as seen in Fig. 3 goes through two cycles about the signal level of curve A. Only the first cycle is used in the computation.

The measured variable A will continue to approach the set point as long as maximum power is supplied in the process. As soon as the curve B crosses the set point line, a set point crossing memory relay is actuated. This relay is not shown in Fig. 1 but is shown in the overall wiring diagram. The set point crossing memory relay is effective to latch the output of the switching block 38 to section 38–1. This means that at the end of interval 11, a deceleration pulse will be produced on the input of the analog 41 by way of the minimum signal generator 40. This is followed by a correct value input signal from signal generator 39. This correct value signal may be considered a constant velocity signal. The resultant output of analog 41 is shown by the dotted curve C. This analog output will tend to swing across the set point line initially due to the inertia of the analog 41 as it is reset to the master analog 13, the latter also having considerable inertia or excess stored energy. Inasmuch as the analog 41 has crossed over the set point line, a further set point crossing memory relay (also not shown in Fig. 1) is actuated and is effective to latch the output of the signal comparator 42 to place the section 44–1 of switching block 44 in an operative condition. Consequently, a signal will be applied to actuate the output transducer section 24–1 to supply a minimum signal to the process. At the point of readout indicated by the letter D, the control signal on the input of the output transducer 24 will be one calling for minimum to the process. The output memory section 24–4 will be effective to set the controller output to minimum and retain the same until a further cycle is completed.

In the next cycle of operation through intervals 1 through 21, the analog 35 will have an output which will again cross the set point. Since the set point has been crossed, the set point crossing memory circuit will retain that information so that during the second half of the computing period the analog 41 will be effective to make a computation. Thus, the curve at C–1 will appear and the positive swing of the curve across the set point will be less than before due to the decrease in the amount of stored energy in the master process analog 13 and in the process proper. However, as long as the curve C swings above the set point, the set point crossing memory circuit will be effective to retain the switching block 44 in position 44–1 or 44–2. This condition will continue until the curve C no longer crosses the set point as evidenced by the curve section C–2. Inasmuch as the curve C–2 does not cross the set point, the output of the signal comparator 42 will actuate the switching section 44–3. This channel will now be effective to apply a control signal to the output transducer section 24–2. At the end of the computing interval at point E, there will be a readout to the memory section 24–4 which will cause the process input to be switched to the correct value.

It will thus be seen from Fig. 3 that the predicting controller will bring the measured variable up to the set point and will level off and retain the measured variable at the set point in the absence of other external factors. It will further be seen from Fig. 3 that the apparatus will first inject a maximum input to the process and then a minimum input into the process so as to brake the approach of the process to the set point. Then, as the process does approach the set point, the correct value of input is supplied to the process so that the measured variable will level off at its desired set point.

Figure 4:
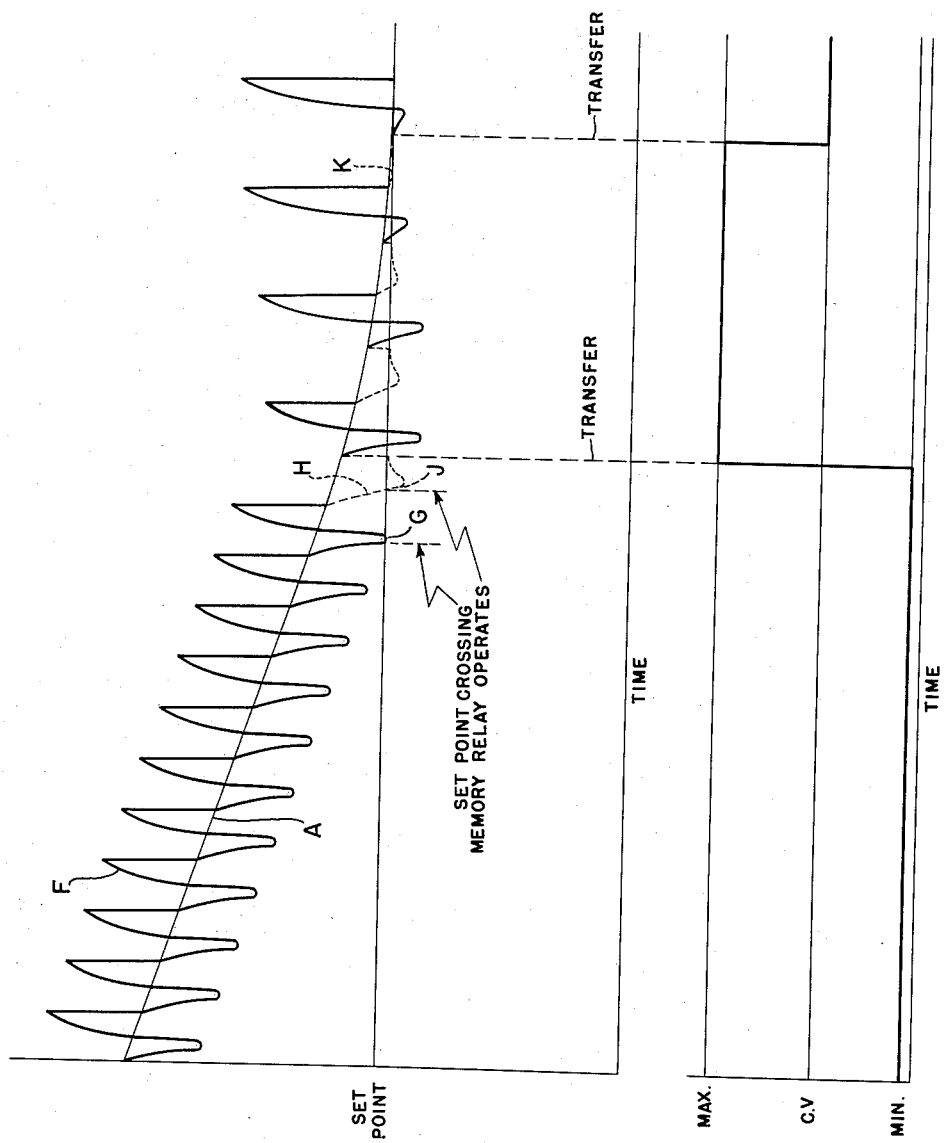
Fig. 4 shows representative curves of the process variable and the computer analogs coming down to the set point from a point above the set point.

The operation of Fig. 1 may further be explained by reference to the process and analog curves shown in Fig. 4. In this instance, the process variable is shown approaching the set point from a point above the set point. This will mean that initially the signal comparator 15 will be actuating the switching block 17 so that the section 17–1 is effective to energize the signal generators 18 and 19 which supply the input signal to the analog 20. As pointed out in Fig. 2, the initial input pulse to the analog 20 after the analog has been reset to the master analog is a minimum input acceleration pulse which takes place during interval 2. As viewed in Fig. 4, this will cause the output signal of the analog 20 to drop initially and then, upon the application of a deceleration pulse in the form of a maximum input pulse by the signal generator 19 during intervals 3 through 10, the output of the analog will rise to a point above the process curve A. In other words, the output of the analog 20 is shown in Fig. 4 by the curve F and this curve is superimposed upon the process variable curve A. As long as the output of the analog 20 does not cross the set point value and remains positive with respect to the set point value, the signal comparator 21 will maintain the switching section 22–1 of the switching block 22 in its effective position so that there will be an input applied to the output transducer section 24–1 which will call for minimum input signal to the process.

With minimum input to the process, the process variable will begin to drop down to the set point value. As soon as the curve F crosses the set point as at point G, a set point crossing memory relay is operated and retains this information so that the switching section 22–3 is effective to actuate the signal generators 25 and 26 to apply an input to the computing analog 27. Thus, in the half cycle immediately following the crossing of the set point as at G, the analog 27 will have an output indicated in Fig. 4 by the numeral H. This analog output is shown as crossing the set point at J and the reason for the crossing will be understood when it is recognized that the inertia or deficiency of energy of the analog is effective to carry the analog output below the set point even though the input signals do not normally produce such a reaction. In other words, the input to the analog 27, as viewed in Fig. 2, is first a deceleration pulse in the form of a maximum input which is applied during interval 12. This is followed by a correct value input between the intervals 13 through 20. Inasmuch as the output of the analog 27 has crossed the set point, a set point crossing memory relay is effective to hold the output so that the signal comparator 29 will have its output section 31–3 in an operative position. This in turn will be effective to actuate the maximum to process section 24–3 so that upon the readout interval, the memory section 24–4 will have as an input a signal calling for maximum input to the process. This maximum input signal is then an effective braking or deceleration pulse on the master process analog as well as on the process 10.

The apparatus will go through another cycle with the analog 20 and the analog 27 both having outputs that cross the set point. As long as this occurs, the input to the process will be a maximum. As the maximum braking pulse becomes effective, the output of the analog 27 will eventually fail to cross the set point value as indicated at K. Inasmuch as the analog has not crossed the set point, the output of the signal comparator 29 will now be a positive signal and this will actuate the switching section 31–1 to in turn activate the output controller section 24–2 which calls for the correct value input to the process. The apparatus will continue by supplying the correct value to the process until some extraneous factor upsets the process and changes the measured variable from the desired set point value.

A practical embodiment of the apparatus described in block diagram form in Figs. 1 through 4 is disclosed in Figs. 5, 6, and 7. While specific physical structure has been embodied in the Figs. 5, 6, and 7, it is to be understood that the switching functions, the analogs, the signal generators, the timing means, and the signal comparators may per se take many varied and known forms.

It will be noted in considering Figs. 5, 6, and 7 that certain components have been arranged so that they may function in more than one capacity depending upon whether the measured variable has deviated above or below the process set point.

Figs. 5, 6, and 7 have also been numbered in such a manner that where possible corresponding reference characters have been assigned to corresponding components between Figs. 1 and 5 through 7. To this end, the analog 20–41 indicates that this analog is used in position 20 in Fig. 1 and also in position 41 in Fig. 1. Similarly, analog 35–27 shown in Fig. 5 is the same as analog 35 and analog 27 of Fig. 1.

The switching functions of the controller are accomplished by the following enumerated components 50, 60, 70, 80, 90, 100, 110, 120, 130, 140, 150, 160, 170, 180, 190 and 200. These components and their associated elements have been listed in tabular form in order to facilitate the location and understanding of the switching functions.

Minus deviation indication relay 50, controlled by signal comparator 15–17, includes the following:

| Switches | Blade | Contacts | |
|---|---|---|---|
| | | Normally Closed | Normally Open |
| 51 | Normally open | | |
| 52 | 52-1 | 52-2 | 52-3 |
| 53 | 53-1 | 53-2 | 53-3 |
| 54 | 54-1 | 54-2 | 54-3 |
| 55 | 55-1 | 55-2 | 55-3 |
| 56 | 56-1 | 56-2 | 56-3 |
| 57 | 57-1 | 57-2 | 57-3 |
| 58 | 58-1 | 58-2 | 58-3 |

Plus deviation indication relay 60, controlled by signal comparator 15–17, includes the following:

| Switches | Blade | Contacts | |
|---|---|---|---|
| | | Normally Closed | Normally Open |
| 61 | Normally open | | |
| 62 | 62-1 | 62-2 | 62-3 |
| 63 | 63-1 | 63-2 | 63-3 |
| 64 | 64-1 | 64-2 | 64-3 |
| 65 | 65-1 | 65-2 | 65-3 |
| 66 | 66-1 | 66-2 | 66-3 |
| 67 | 67-1 | 67-2 | 67-3 |
| 68 | 68-1 | 68-2 | 68-3 |

Set point crossing memory relay 70, controlled by signal comparator 21–42, includes the following:

| Switches | Blade | Contacts | |
|---|---|---|---|
| | | Normally Closed | Normally Open |
| 71 | 71-1 | 71-2 | 71-3 |

Set point crossing memory relay 80, controlled by signal comparator 36–29, includes the following:

| Switches | Blade | Contacts | |
|---|---|---|---|
| | | Normally Closed | Normally Open |
| 81 | 81-1 | 81-2 | 81-3 |

Set point crossing memory indicator relay 90 includes the following:

| Switches | Blade | Contacts | |
|---|---|---|---|
| | | Normally Closed | Normally Open |
| 91 | Normally open | | |
| 92 | 92-1 | 92-2 | 92-3 |
| 93 | Normally open | | |
| 94 | Normally closed | | |
| 95 | Normally open | | |

Set point crossing memory indicator relay 100 includes the following:

| Switches | Blade | Contacts | |
|---|---|---|---|
| | | Normally Closed | Normally Open |
| 101 | Normally open | | |
| 102 | 102-1 | 102-2 | 102-3 |
| 103 | Normally open | | |
| 104 | do | | |
| 105 | Normally closed | | |

Motor driven sequence timer 110 includes switch cam 111, riser 112, and the following switches:

Analog reset 113
Analog reset 114
Memory clearing 115
Initial read in 116
Acceleration pulse 117
Acceleration pulse 118
Final read out 119

Analog reset relay 120 operated by timing switches 113 or 114 includes the following:

| Switches | Blade | Contacts | |
|---|---|---|---|
| | | Normally Closed | Normally Open |
| 121 | 121-1 | 121-2 | 121-3 |
| 122 | 122-1 | 122-2 | 122-3 |
| 123 | 123-1 | 123-2 | 123-3 |
| 124 | 124-1 | 124-2 | 124-3 |

Analog reset relay 130 operated by timing switches 113 or 114 includes the following:

| Switches | Blade | Contacts | |
|---|---|---|---|
| | | Normally Closed | Normally Open |
| 131 | 131-1 | 131-2 | 131-3 |
| 132 | 132-1 | 132-2 | 132-3 |
| 133 | 133-1 | 133-2 | 133-3 |

Memory clearing relay 140 operated by timing switch 115 includes the following:

Switches—all normally closed: 141, 142, 143, 144, 145, 146.

Initial read in relay 150 operated by switch 116 includes the following:

Switches—all normally open: 151, 152, 153.

Acceleration pulse relay 160 operated by switches 117—118 includes the following:

| Switches | Blade | Contacts | |
|---|---|---|---|
| | | Normally Closed | Normally Open |
| 161 | 161-1 | 161-2 | 161-3 |
| 162 | 162-1 | 162-2 | 162-3 |
| 163 | 163-1 | 163-2 | 163-3 |
| 164 | 164-1 | 164-2 | 164-3 |

Final read out relay 170 operated by timing switch 119 includes the following:

Switches—all normally open: 171, 172, 173.

Output memory relay, maximum output, 180 includes the following:

Coil 181
    Switch 182
    Latch 183
    Latch coil 184
    Isolating rectifiers 185, 186

Output memory relay, correct value output, 190 includes the following:

Coil 191
    Switch 192
    Latch 193
    Latch coil 194
    Isolating rectifiers 195, 196

Output memory relay, minimum output, 200 includes the following:

Coil 201
    Switch 202
    Latch 203
    Latch coil 204
    Isolating rectifiers 205, 206

For actuating the relays enumerated above, there are provided a pair of batteries 210 and 211.

First computation latching relay 207 includes the following:

Switch 208—Normally open
    Switch 209—normally closed

First computation latching relay 212 includes the following:

Switch 213—normally open
    Switch 214—normally closed

Cross over relay 400 includes the following:

Switch 401—normally open

Cross over relay 410 includes the following:

Switch 411

The apparatus for producing the desired simulated process input signals for the computer for predictor analogs 35–27 and 20–41 is shown at 215. This signal generator is adapted to have its output varied in accordance with the biasing signals applied thereto by the biasing source which includes a battery 216 having a potentiometer 217 connected thereacross, the latter including a slidewire resistor 218 and a slider 219.

The analogs 20–41, 35–27, and 13 are each constructed in like manner with all of the analogs substantially duplicating the parameters of the process 10. The computer or predictor analogs 20–41 and 35–27 have a time constant which is a small fraction of the total process time constant and hence, a small fraction of the time constant of the master process analog 13.

The computer analog 20–41 comprises three capacitors 220, 221, and 222. The computer analog also includes three resistors 223, 224, and 225, the latter of which is tapped at 226.

The computer analog 35–27 comprises three capacitors 230, 231, and 232. Also included in this computer analog are three resistors 233, 234, and 235, the latter of which is tapped at 236.

The master analog 13 comprises three capacitors 240, 241, and 242. In addition the master analog comprises three resistors 243, 244, and 245, the latter of which is tapped at 246.

For keeping the computer or predictor analogs 35–27 and 20–41 in step with the master analog 13, there are provided three conventional operational amplifiers 250, 251, and 252. These amplifiers are effective to reset the charge in the capacitors of each of the computer analogs with the charge on the corresponding capacitors in master analog during the reset interval, thereby to establish the level or datum point about which the computer analogs are adapted to operate. A similar operational amplifier 253 may be used to continuously monitor the process 10 and reset the bias on a control signal generator 254 so that the master analog will be maintained in step with the process.

The bias signals for the generator 254 may be produced by the source 255 which comprises a battery 256, a potentiometer 257 connected across the battery 256, the latter including a slidewire resistor 258 and a slider 259.

For regulating the process input directly, there is shown a process controller 260 which may be of any conventional type suitable for varying the input of the process 10 so as to cause the measured variable to be regulated in accordance with the output of the output transducer 24.

The motor driven sequence timer 110 is used to time the operation of the relays which control the resetting of the computer analogs to the master analog, control the read out relays and further control the acceleration and braking pulse signals applied to the computer analogs 20–41 and 35–27. As shown, the timing cam moves in a clockwise direction with the cam 112 operating switches 113, 117, 114, 118, and 119 in the order named. The switching sequence for the relays and switches of the apparatus has been shown in graphical form in Fig. 8. Reference should be had to this drawing in considering the following operational description of Figs. 5, 6, and 7.

It is first assumed in considering the overall wiring diagram that the measured variable is on the set point. The set point signal may be manually put into the signal comparator 15–17 and the signal from the process 10 will be applied to the signal comparator by a connector 265 which leads directly to the input of the signal comparator 15–17. If the measured variable is on the set point, the output from the signal comparator will be by way of the zero output lead 266 which connects directly to the section 24–2 at switch 172. The deviation indication relays 50 and 60 will not be actuated and therefore there will be no other output control action going into the output transducer 24–2. Thus, as the timing cam 111 rotates, the switches controlled thereby will be actuated but the only switch which will be effective to produce any controlling action on the output will be the read out switch 119. When the read out switch 119 closes, at interval 21 in Fig. 8, a circuit is completed to the final read out relay 170 by a circuit that may be traced from the battery 211 to conductor 267, switch 119, conductor 268, to the relay coil of the relay 170. The relay 170 will remain energized until the cam surface 112 again opens the switch 119. This will mean that a circuit may be traced to the relay coil 191 from the battery 210 through lead 270, the signal comparator 15–17, lead 266, section 24–2 at switch 172, closed by the relay 170, rectifier 195, coil 191, and lead 271 to ground. The energization signal on the coil 191 will be effective to close the switch 192. At the same time that a current pulse is applied to the relay coil 191, a further current pulse is applied to all of the latching coils 184, 194, and 204. The latch coil 184 is energized by the current signal coming in through the switch 172, rectifier 196, lead 273, coil 184, and lead 271 to ground. Similarly, the coil 194 is energized from the current flowing through rectifier 196, coil 194, and lead 271 to ground. The latch coil 204 is energized by a circuit that may be traced from the input switch 172, rectifier 196, lead 273, and coil 204 to ground. The energization of the latch coils in each of the memory relays 180, 190, and 200 is effective to release any information stored in the relays during the prior operational period.

Inasmuch as the coil 191 is the only coil which is energized under the present assumed conditions, this coil will be maintained energized by the condenser connected in parallel therewith so that when the current input signal is removed from the input lead 266, the coil will hold long enough so that the latch coil 194 will release the latch 193. This will lock the switch 192 in a closed position. Inasmuch as the other memory relays 180 and 200 have not received any input current signals through their actuating coils 181 and 201 respectively, these coils will remain in the deenergized position.

With the switch 192 locked in the closed position, a biasing signal will be applied to the signal generator 254. This biasing signal is derived from the biasing source 255 by way of the slider 259, lead 275, switch 192, and lead 196 to the input of the signal generator 254. In addition, the bias signal from the switch 192 also passes to the process input controller 260. The signal input to the signal generator and to the process controller will call for the producing on the input of the master analog and the process the correct value of input. This correct value input is sometimes referred to as the steady state solution input which will maintain the measured variable at its set point value. As long as the set point and the measured variable are the same, the relay 190 will remain in a position in which the switch 192 is continuously closed.

The next operating condition to be assumed is one where the measured variable is considerably below the set point value. When this occurs, the output from the signal comparator 15–17 will be negative and an energizing signal will be supplied from the battery 210 through lead 270, the signal comparator 15–17 and lead 280 to the coil of the relay 50. When the relay 50 becomes energized, the respective switch blades will be switched from the normally closed position identified by the numeral 2 to the normally open position identified by the numeral 3. Further, the switch 51 will be closed.

At the start of the timing interval, the switching surface 112 of the timing cam 111 will close switch 113 and switch 115. This occurs during interval one in Fig. 8. When the switch 113 is closed, the relays 120 and 130 are energized so that the respective switch blades 121–1, 122–1, and 123–1, move into engagement with the respective contacts 121–3, 122–3, and 123–3. Similarly, the blades 133–1, 132–1, and 131–1, are moved into engagement with the respective contacts 133–3, 132–3, and 131–3. When this switching operation takes place the computer analogs 20–41 and 35–27 are connected in parallel with the master analog 13 by means of the operational amplifiers 250, 251, and 252. The operational amplifiers are effective during this interval to reset the computer analog capacitors so that their initial operating conditions are established at the level of the corresponding capacitors of the master analog.

Also actuated during this first interval is the relay 140 which is actuated by the closing of switch 115. The energizing circuit may be traced from battery 211 through lead 267, switch 115 to the coil of relay 140. When the relay 140 is energized, each of its contacts 141, 142, 143, 144, 145 and 146 are opened. The energization of this relay is effective to clear the memories from the relays 70, 80, 90, 100, 207 and 212 for reasons that will be apparent upon considering the completion and start of a new cycle.

During interval two of the complete timing period, the timing switch 117 will be closed. When the switch 117 is closed, an energizing circuit is completed to the acceleration pulse relay 160 by a circuit that may be traced from the battery 211 to lead 267, switch 117, the coil of relay 160 to ground. When the relay 160 is energized, a bias pulse is applied to the signal generator 215 to cause the output of the generator to produce an acceleration pulse. Inasmuch as the relay 50 has been energized it is desired that the acceleration pulse to the computer analog 35–27 first be a maximum input. With the relay 160 energized and with relay 50 energized, the maximum signal bias to the generator 215 may be traced to the input of the generator from the grounded or maximum signal bias terminal of potentiometer 217 through contact 161–3, switch blade 161–1, contact 58–3, switch blade 58–1, switch 94, and lead 285 to the input of the signal generator 215.

The output of the signal generator 215 will be applied to the input of the computer analog 35–27 by way of lead 286, blade 92–1, contact 92–2, lead 287, contact 52–3, blade 52–1, to the input of the analog 35–27.

Following the acceleration pulse produced by the closing of the acceleration pulse switch 117, there is a braking or deceleration pulse applied to the input of the computer analog 35–27. The braking pulse occurs during intervals three to ten. This braking pulse will be produced by the signal generator 215. The output of the signal generator 215 will be changed due to the fact that the relay 160 is now deenergized by the opening of switch 117. The input signal to the signal generator 215 may be traced from the minimum signal terminal of potentiometer 217 through lead 287, contact 161–2, blade 161–1, contact 58–3, blade 58–1, switch 94, lead 285, to the input of the generator 215. The output from the generator 215 will pass through the aforementioned circuit through lead 286, blade 92–1, contact 92–2, lead 287, contact 52–3, and blade 52–1 to the input of the computer analog 35–27.

The output wave form of the analog 35–27 will be of the general shape shown in Fig. 3 for curve B.

The output of the analog 35–27 is fed into the signal comparator 36–29 by way of lead 290. If the output of the analog 35–27 remains below the set point value, the output from the signal comparator 36–29 will be on lead 291 and a signal circuit may be traced to the output transducer circuit 24–2 from the battery 210 through switch blade 124–1, switch contact 124–2, lead 292, switch 51, signal comparator 36–29, lead 291, switch blade 53–1, switch contact 53–3, switch blade 71–1, switch contact 71–2, switch blade 56–1, and switch contact 56–2 to the read in switch 153.

When the read in relay 150 is energized, the switch 153 will close so that a signal will be applied by way of lead 293 to the input section 24–3. The energizing circuit for the relay 150 may be traced from the battery 211, through lead 267, switch 116, and lead 302 to the relay coil. This signal on lead 293 produces an energizing signal for the latching relay 207 by way of the switch 145. When the latching relay 207 pulls in, the switch 208 will close to complete an energizing holding circuit for relay 207 from battery 415 by way of lead 311 and switch 208. At the same time, switch 209 is opened to prevent the completion of any other computing circuit during the last half cycle of the computing period.

There will be no output from the maximum output memory relay 180 until the switch 171 is closed. Inasmuch as this switch is not closed until the end of the complete timing period, it will be apparent that the current pulse appears upon section 24-3 through the holding circuit of relay 207. During the second half cycle of the timing period, at interval twenty-one, the signal which is on section 24-3 will be effective so that when the relay 171 is closed the output memory circuit 180 will be actuated. Before this happens, however, it should be noted that the timing cam 112 will have actuated the switches 114 and 116 and the switch 118. This will mean that the computer analog 35-27 will be reset to the master analog and that it will make a second computation which is not used as the relay 107 has latched an input signal to section 24-3. As soon as the switch 171 is closed, a current pulse will be fed to the rectifier 185 and coil 181 to move the switch 182 to a closed position. The latches on each of the relays 180, 190, and 200 will be released when the switch 171 is closed so that any input signals stored in any of the other relays 190 or 200 will be dropped and the new input to the relay 180 will be stored. The relay 180 will hold this signal until a further pulse comes along to change the condition of the output memory.

When the switch 182 is closed, a maximum input signal bias is applied to the signal generator 254 and the circuit for this may be traced from the maximum signal or grounded terminal of the potentiometer 257 through lead 295, switch 182, and lead 296 to the input of the signal generator 254. Further, there will be a maximum input signal bias applied to the process controller 260 by way of the last traced circuit.

As viewed in Fig. 3, as long as the signal curve B representing the output of the analog 35-27 is below the set point signal, the output memory relay 180 will be in an actuated position to supply a maximum input signal to the master analog as well as to the process.

As the measured variable approaches the set point value, the analog signal on the output of the analog 35-27 will eventually cross the set point. When the set point is crossed, this will be detected by a signal comparator 36-29 so that an impulse will appear upon the plus output lead 298. In order to store the information that the set point has been crossed, a set point crossing relay 70 will become energized by a circuit that may be traced from the battery 210 through lead 292, switch 51, signal comparator 36-29, lead 298, switch blade 54-1, switch contact 54-3, to the coil of relay 70. When the relay 70 becomes energized, the blade 71-1 is moved into engagement with contact 71-3. Thus, even though the output from the signal comparator 36-29 may again swing to the output lead 291, the relay 70 will remain energized and this time by a circuit that may be traced from the input lead to the signal comparator 36-29 through lead 291, switch blade 53-1, contact 53-3, blade 71-1, and contact 71-3 to the relay 70. Thus, the relay 70 establishes its own holding circuit.

When the blade 71-1 moves out of engagement with contact 71-2, the former circuit to the output transducer 24 will be broken. A circuit will be established to the further set point crossing memory indicator relay 90. This energizing circuit may be traced from the output lead 298 of the signal comparator 36-29 which carries a relay actuating current through blade 54-1, contact 54-3, lead 300, blade 57-1, contact 57-3, to lead 301. The signal on the lead 301 will remain there until the read in relay 150 is actuated. This read in relay is actuated half way through the computing period at interval 10 and by the cam surface 112 closing switch 116. When the switch is closed, an energizing circuit for the relay 150 is established from the battery 211 through switch 116 and lead 302 to the relay 150. When the relay 150 is energized, the switch 151 is closed as is the switch 152. When the switch 151 is closed, an energizing circuit is established to the crossover relay 400 through switch blade 55-1 and switch contact 55-3 through the coil of the relay to ground. When the relay 400 pulls in, the switch 401 is closed to establish a starting circuit for relay 90, which starting circuit is completed by the pulling in of relay 120. This may be traced from the battery 210 through blade 124-1, switch contact 124-3 (the latter being closed during interval 11), lead 303, switch 401, relay 90, and switch 142 to ground. Relay 90 will then establish its own holding circuit from battery 415 by way of switch 91. When the relay 90 becomes energized, this relay will set the apparatus up for a second computation by the application of an input signal to the computer analog 20-41. As discussed above in Fig. 2, it is desired that the input to the analog 20-41 under these circumstances be a minimum during the deceleration pulse and of the correct magnitude during the constant velocity pulse. Further, when the relay 90 becomes energized, the switch 94 associated with the input of the signal generator 215 will be opened and the switch 95 will be closed.

As soon as the camming surface 112 closes switch 118, the relay 160 will become energized and a minimum input bias signal will be supplied to the generator 215 by a circuit that may be traced from the minimum lead of the potentiometer 217 through contact 163-3, switch blade 163-1, switch 95, switch contact 68-2, switch blade 68-1, and switch 105 to the input lead 285 of the generator 215. With the energization of the relay 90, the output of the signal generator 215 will be fed to the input of the computer analog 20-41 through lead 286, blade 92-1, contact 92-3, contact 62-2, and switch blade 62-1.

Upon the completion of the interval when the switch 118 is closed to apply a deceleration pulse to the computer analog 20-41, it is desired that a correct value or constant velocity input signal be applied to the analog 20-41. This will occur when the relay 160 becomes deenergized so that an input biasing circuit to the signal generator 215 may be traced from the slider 219 through contact 163-2, switch blade 163-1, switch 95, switch contact 68-2, blade 68-1, switch 105, and lead 285 to the input of the signal generator 215. The output from the signal generator 215 will again be through the lead 286, blade 92-1, switch 92-3, switch 62-2 and blade 62-1 to the input of the analog 20-41.

Referring to Fig. 3, the dotted line curve C first appearing in the time sequence is assumed to represent the output signal from the analog 20-41. In other words, the output of the analog 20-41 applied to the input of the signal comparator 21-42 by way of lead 305 will start out as a negative signal but will cross over the set point so that there will be a positive signal on the output of the comparator 21-42. As soon as a positive signal appears on the output of the signal comparator 21-42, the set point crossing memory relay 80 will become energized. This energizing circuit may be traced from the battery 210 through switch blade 124-1, switch contact 124-2, switch 93, lead 306, signal comparator 21-42, lead 307, switch blade 63-1, switch contact 63-2, and the coil of relay 80 through switch 143 to ground. When the relay 80 becomes energized the blade 81-1 moves into engagement with contact 81-3 so that the output from the signal comparator 21-42 will appear upon the output lead 308. This signal will in turn be applied through switch blade 66-1, and contact 66-2 to the read in switch 154. When the camming surface 112 actuates switches 119 and 119A, the relay 150 will be energized to close read in switch 154 so that a signal will appear on lead 309. The signal on the input lead 309 to section 24-1 will be applied to the output section 24-1 when switch 173 is closed. When closed, a pulse will be applied to the latching coils 184, 194, and 204, to release any prior information that was stored in the memory circuit and the coil 201 will become energized to close the switch 202. When the switch 202 is closed, the minimum bias signal from the minimum output terminal of potentiometer 257 is fed through lead 310, switch 202, and lead 296 to the signal generator 254. Likewise, the signal on lead 296 is applied to the process controller 260 so that a minimum input signal will be applied to the master analog and to the process.

Following the read out of the signal into the output transducer 24, the computer is completely reset with the memories of the relays 70, 80, 90, 100, 207 and 212, being cleared by the operation of the switch 115 which energizes the relay 140. Switch 141, in opening, breaks the energizing circuit for relay 70. Switch 142, in opening, breaks the energizing circuit for relay 90. Similarly, the opening of switches 143 and 144 will break the energizing circuits for relays 80 and 100 respectively. Switches 145 and 146 likewise break the energizing circuit for relays 207 and 212, respectively. Thus, the controller will start out a new prediction with a fresh approach on the input signal comparator 15-17. The output memory relay which is energized will retain its information until a change in the input signals to the output transducer 24 has been received.

As soon as the output from the computer analog 20-41 fails to cross the set point, as indicated at C-2 in Fig. 3, the signal comparator 21-42 will have an output on lead 312 which will be applied directly to the correct value input section 24-2 of the transducer 24. This circuit may be traced from lead 312 through switch blade 64-1, contact 64-2, switch blade 81-1, contact 81-2, switch 67-1, contact 67-2, to lead 315. From lead 315, the signal goes through switch 214, blade 65-1, and contact 65-2 to the correct value input section 24-2. As soon as the read out pulse occurs upon the closing of switch 119, the controller output will be transferred from minimum input to the process, indicated by the memory relay 200, to the correct value input indicated by the relay 190. This is indicated in Fig. 3 by the transfer point occurring at point E.

If the process variable remains on the set point value, the signal comparator 15-17 will have an output on its lead 266 which will hold the correct value memory relay 190 in an energized position where it is controlling the process 10 and the master analog 13.

Next to be considered in the overall wiring diagram is the operation of the apparatus when the measured variable signal is above the set point signal as shown in Fig. 4. When the measured variable is above, the output of the signal comparator 15-17 on the plus output lead 320 will be effective to actuate the plus deviation indication relay 60. When the relay 60 becomes energized, its associated switch blades will move from the deenergized position to the energized position. At the start of the timing cycle, the timing cam 111 and its timing surface 112 will close the switches 113 and 115 so as to reset the computer analogs 20-41 and 35-27 to the master analog 13. Further, the set point crossing memory relays 70, 80, 90, and 100 and latching relays 207 and 212 will be cleared or deenergized by the closing of switch 115 which in turn energizes relay 140. Further, the current to the computer relays will be cut off by the opening of switch 124.

The switching sequence for the operation during the situation when the variable is above the set point can likewise be observed in Fig. 8.

During the second interval of the computing period, the switch 117 will be closed and the relay 160 will be energized. When so energized, an acceleration pulse will be applied to the input of the computer analog 20-41 and this will be an input signal which is a minimum during the acceleration pulse. The minimum bias signal circuit for the signal generator 215 may be traced from the minimum signal lead of potentiometer 217 through contact 164-3, switch blade 164-1, contact 68-3, switch blade 68-1, contact 105, and lead 285 to the signal generator 215. The output from the signal generator 215 will be fed by way of lead 321 through blade 102-1, contact 102-2, lead 322, contact 62-3, and switch blade 62-1 to the input of the computer analog 20-41.

After the application of the acceleration pulse to the input of the computer analog 20-41, there is a following deceleration or braking pulse which in this instance will be a maximum input to the analog. The maximum input bias signal to the signal generator 215 will originate from the maximum bias lead of potentiometer 217, switch contact 164-2, switch blade 164-1, contact 68-3, switch blade 68-1, switch 105, and lead 285 to the input of signal generator 215. The output from the signal generator will be as before through lead 321, switch 102, and switch 62 to the input of the analog 20-41.

With a minimum input acceleration pulse applied to the analog 20-41 followed by a maximum input braking pulse, the output will be the curve F shown in Fig. 4. The output of the analog will be fed into the signal comparator 21-42 by way of lead 305. If the analog output remains above the set point value throughout its cycle, the output from the signal comparator 21-42 will be along lead 307, switch blade 63-1, switch contact 63-3, switch blade 81-1, switch contact 81-2, switch blade 67-1, and switch contact 67-3 to switch 154. The switch 154 will remain open until the read in relay 150 is energized by the closing of switch 116. When switch 154 is closed, the latching relay 212 will be energized by a circuit that may be traced from the energized signal lead 307, switch blade 63-1, switch contact 63-3, blade 81-1, contact 81-2, blade 67-1, contact 67-3, switch 154, lead 309, relay 212, and switch 146 to ground. When relay 212 pulls in, holding switch 213 closes to complete a holding circuit from the energized lead 311 through switch 213, lead 309, relay 212 and switch 146 to ground. With relay 212 energized, switch 214 will open to prevent the completion of a computing circuit during the following half cycle of the computing period. As soon as the read out pulse occurs by the closing of the switch 119, the switches 171, 172, and 173 will be closed by the operation of the relay 170 and the signal on the lead 309 will be read into the memory relay 200. The memory relay 200 will be effective to close switch 202 and supply a minimum bias signal to the signal generator 254 and a minimum input signal to the process controller 260. The minimum input memory relay 200 will remain in an activated position until such time as the computer analog 20-41 has an output which crosses the set point.

When the analog output of analog 20-41 crosses the set point, the signal comparator 21-42 will have an output on its negative output lead 312 which will result in there being applied to the set point crossing relay 80 an energizing signal that may be traced from the lead 312 through blade 64-1, contact 64-3, the coil of the relay 80, and switch 143 to ground. With relay 80 energized, the blade 81-1 will be moved into engagement with contact 81-3 and the relay 80 will establish its own holding circuit. The output of the signal comparator 21-42 will now appear upon the lead 308 so that a signal will be applied through switch blade 66-1 and contact 66-3 to lead 325. As soon as the read in relay 150 operates with the closing of timing switch 116, the switch 152 will close and the signal on the lead 325 will be fed through the switch to lead 315, switch 214, switch blade 65-1, contact 65-3, and relay 410 to ground. When relay 410 pulls in, switch 411 closes to establish a starting circuit for relay 100, which starting circuit will be completed when the relay 120 is energized. This may be traced from the battery 210 through blade 124-1, switch contact 124-3, lead 303, switch 411, relay 120, and switch 144 to ground.

When the relay 100 becomes energized, it first closes switch 101 which is effective to establish a holding circuit for the relay 100 from the source 415. Further, it sets up the input to the computer analog 35-27 so that a further computation may be made to determine if there should be a change in the output control action.

The input to the computer analog 35–27 under the present assumed conditions will be an acceleration pulse which is maximum during interval 12 followed by a coasting or constant velocity pulse which will be the correct value from intervals 13 through 20. The output of the analog 35–27 will be represented by the dashed curve H of Fig. 4. If that output crosses the set point line as at J, as assumed in Fig. 4, the output of the signal comparator 36–29 will be on the lead 291 and will be fed to the relay 70 to cause the relay to pull in to indicate that the set point has been crossed in this particular analog. With the relay pulled in, the output of the signal of the comparator 36–29 will be on lead 300 and it will be applied through blade 57–1, contact 57–2, to switch 153. When the read in relay 150 is pulled in on interval 21, the switch 153 will be closed to put a signal on the lead 293 and then to the maximum input section 24–3 of the output transducer. This will set the apparatus up so that upon the actuation of the read out relay 170, the maximum input memory relay 180 will become energized to supply a maximum bias signal to the signal generator 254 and a maximum input signal to the process controller 260.

As long as both of the outputs of the computer analogs 20–41 and 35–27 cross the set point in the subsequent computing periods, the memory relay 180 will be retained in its actuated position to supply a maximum signal to the master analog 13 and to the process 10.

As soon as the output of the analog 35–27 no longer crosses the set point signal, as represented at K in Fig. 4, the set point crossing memory relay 70 will no longer be energized and the output will be by way of lead 298, switch blade 54–1, contact 54–2, switch blade 71–1, switch contact 71–2, switch blade 56–1, contact 56–3, switch 209, switch blade 55–1, switch contact 55–2, and lead 266 to the correct value input section 24–2. The signal on section 24–2 will be effective upon the read out pulse closing the switches 171, 172, and 173, to energize the correct value input memory relay 190. The apparatus will continue to operate in the foregoing manner until the measured variable is on the set point at which time the signal comparator 15–17 will have an output on its zero deviation lead 266 which will supply the control signal to the correct value input section 24–2.

It will be readily apparent that while the apparatus has been considered in its operation as approaching the set point from two extreme positions, the controller apparatus will function to maintain the measured variable on the set point or return the measured variable upon a process input to the set point in a minimum of time in accordance with the principles set forth above.

It will further be apparent that the circuitry utilized in accomplishing the basic principle shown in Figs. 5 through 7 may be readily modified to simplify the complication which appears due to the use of relays and mechanical-electrical switches.

While, in accordance with the provisions of the statutes, there has been illustrated and described the best forms of the invention known, it will be apparent to those skilled in the art that changes may be made in the forms of the apparatus disclosed without departing from the spirit of the invention as set forth in the appended claims and that in certain cases, certain features of the invention may be used to advantage without a corresponding use of other features.

Having now described the invention, what is claimed as new and for which it is desired to secure Letters Patent is:

1. Control apparatus for a process comprising a computer analog of the process, means responsive to the output of the process and connected to selectively apply varying signals to the input of said analog, signal responsive means connected to the output of said analog, a set point signal source connected to said signal responsive means, said signal responsive means having an output which is a predetermined function of the difference between said set point signal source and said analog output, and a process controller connected to be controlled by said signal responsive means.

2. Control apparatus for a process comprising a computer analog of the process, means actuated in accordance with a condition of the process and connected to selectively apply varying signals to the input of said analog, signal responsive means connected to the output of said analog, a set point signal source connected to said signal responsive means, said signal responsive means having an output which is a predetermined function of the difference between said set point signal source and said analog output, a process controller, and periodically actuated means connecting said signal responsive means to said process controller.

3. Apparatus for regulating the magnitude of a variable in a process comprising a predicting analog of the process, periodically operated means actuated in accordance with a condition of the process and connected to apply preselected inputs to said analog, comparison means connected to the output of said analog to compare said output with a preselected set point for the variable to be regulated, a process controller, and means periodically connecting said comparison means to control the operation of said process controller.

4. Apparatus for regulating the magnitude of a variable in a process comprising a predicting analog of the process, periodically operated means actuated in accordance with a condition of the process and connected to apply preselected inputs to said analog, comparison means connected to the output of said analog to compare said output with a preselected set point for the variable to be regulated, a process input controller, an input signal memory means connected to said process input controller, and means periodically connecting said comparison means to said signal memory means.

5. In a predicting controller for a process, the combination comprising, a master analog of the process having a time constant and damping factor comparable to that of the process, a computer analog of the process having a damping factor which is comparable to that of said master analog and a time constant which is a fraction of that of the master analog, and means periodically connecting said computer analog to said master analog so that said computer analog is reset to the conditions in said master analog.

6. In a predicting controller for a process, the combination comprising, a master analog of the process having a time constant and a damping factor comparable to that of the process, a pair of computer analogs of the process adapted to be operated solely or jointly in the control of the process, and means periodically connecting both of said computer analogs to said master analog to reset said computer analogs to the conditions of said master analog.

7. An apparatus for regulating the magnitude of a process variable, comprising in combination, a computer analog of the process, means responsive to the magnitude of the process variable, means actuated by the first mentioned means and connected to said analog to apply a first magnitude input signal thereto for a first predetermined interval, further means actuated by said first mentioned means and connected to said analog to apply a second magnitude input signal thereto for a second predetermined interval, a signal comparator connected to the output of said analog, a variable set point input connected to said signal comparator, and periodically actuated means connecting said signal comparator in controlling relation to the regulated variable at the end of said second predetermined interval.

8. An apparatus for regulating the magnitude of a process variable, comprising in combination, a computer analog of the process, means responsive to the magnitude of the process variable, means actuated by the first mentioned means and connected to said analog to apply a first magnitude input signal thereto for a first predetermined interval, further means actuated by said first mentioned means and connected to said analog to apply a second magnitude input signal thereto for a second predetermined interval, a signal comparator connected to the output of said analog, a variable set point input connected to said signal comparator, periodically actuated switching means connected to said signal comparator, a process variable controller, input signal memory means connected to said process variable controller, and means including said periodically actuated switching means connecting said signal comparator to said input signal memory means after the end of said second predetermined interval.

9. A predicting controller for regulating the magnitude of a process variable comprising a first analog of the process having a time constant which is a fraction of that of the process, means responsive to the magnitude of the process variable, means actuated by the first mentioned means and periodically connecting, to the input of said first analog, signals indicative of representative process input signals, a first set point signal comparator connected to the output of said first analog and supplied with a set point signal, a second analog of the process having a time constant which is a fraction of that of the process, means controlled by the output of said first signal comparator for connecting, to the input of said second analog, signals indicative of representative process input signals, a second set point signal comparator connected to the output of said second analog and supplied with a set point signal, and a process controller connected to be controlled by the output of said first and second signal comparators.

10. A predicting controller for regulating the magnitude of a process variable comprising a first analog of the process having a time constant which is a fraction of that of the process, means responsive to the magnitude of the process variable, means actuated by the first mentioned means and periodically connecting, to the input of said first analog, signals indicative of representative process input signals, a first set point signal comparator connected to the output of said first analog and supplied with a set point signal, a second analog of the process having a time constant which is a fraction of that of the process, means controlled by the output of said first signal comparator for connecting, to the input of said second analog, signals indicative of representative process input signals, a second set point signal comparator connected to the output of said second analog and supplied with a set point signal, an output signal memory means, and means connecting said first and second signal comparators to said signal memory so that said memory means will be controlled by one or the other of said signal comparators.

11. In a controller for regulating the magnitude of a process variable comprising signal detecting means having an output indicative of whether the magnitude of the variable is above, at, or below a set point value, first and second computer analogs of the process each having a time constant less than the time constant of the process, means including said signal detecting means for applying to either said first or said second analog input signals representative of input signals to the process, a second signal detecting means connected to the output of that analog having an input signal applied thereto, said second signal detecting means having an output indicative of whether the analog output is above, at, or below a representative set point signal, and means connected to said second signal detecting means being arranged to apply to the process a control signal of a first or second magnitude in accordance with the output of said second signal detecting means.

12. In a controller for regulating the magnitude of a process variable comprising signal detecting means having an output indicative of whether the magnitude of the variable is above, at, or below a set point value, first and second computer analogs of the process each having a time constant less than the time constant of the process, means including said signal detecting means for applying to either said first or said second analog input signals representative of input signals to the process, a second signal detecting means connected to the output of that analog having an input signal applied thereto, said second signal detecting means having an output indicative of whether the analog output is above, at, or below a representative set point signal, a process analog having a time constant corresponding to the time constant of the process, means connecting said second signal detecting means to control the application of a control signal to the process and to the process analog, and periodically operated means connecting said first and second computer analogs to said process analog so that said computer analogs are reset to the process.

13. In a controller for regulating the magnitude of a process variable comprising signal detecting means having an output indicative of whether the magnitude of the variable is above, at, or below a set point value, first and second computer analogs of the process each having a time constant less than the time constant of the process, means including said signal detecting means for applying to either said first or said second analog input signals representative of input signals to the process, a second signal detecting means connected to the output of that analog having an input signal applied thereto, said second signal detecting means having an output indicative of whether the analog output is above, at, or below a representative set point signal, a process analog having a time constant corresponding to the time constant of the process, means connecting said second signal detecting means to control the application of a control signal to the process and to the process analog, and a controller output memory circuit included in said last named connecting means, said memory circuit holding the output of said second signal detecting means into the process for a predetermined interval.

14. In apparatus for regulating the magnitude of a process variable, the combination comprising, a process variable signal comparator having a first output when the variable is above a set point value, a second output when the variable is equal to the set point value, and a third output when the variable is less than the set point value, a multi-position output controller, a pair of process computer analogs, means including said signal comparator when having said first or said third output connecting one or the other of said computer analogs to an input signal source, a further signal comparator connected to that analog having an input signal source connected thereto, said further signal comparator having a first output when the analog signal is above a predetermined set point and a second output when the analog signal is below a predetermined set point, circuit means connecting the first and second outputs of said further signal comparator to said multi-position output controller, and further circuit means connecting the second output of said first named signal comparator to said multi-position output controller.

15. In apparatus for regulating the magnitude of a process variable, the combination comprising, a process variable signal comparator having a first output when the variable is above a set point value, a second output when the variable is equal to the set point value, and a third output when the variable is less than the set point value, a multi-position output controller, a pair of process computer analogs, means including said signal comparator when having said first or said third output connecting one or the other of said computer analogs to an input signal source, a further signal comparator connected to that analog having an input signal source connected thereto, said further signal comparator having a first output when the analog signal is above a predetermined set point and a second output when the analog signal is below a predetermined set point, circuit means connecting the other analog to be controlled by the second output of said further signal comparator, a third signal comparator connected to the output of said other analog, and means connecting said first named, said further and said third signal comparators to said multiposition output controller.

16. A predicting controller for regulating the magnitude of a process variable comprising, a process regulator, a computer analog of the process, a signal source for producing a plurality of representative process input signals, first switch means when actuated connecting said computer analog to be reset to the process, second switch means when actuated connecting said signal source to said computer analog, and third switch means when actuated connecting said computer analog to said process regulator.

17. A predicting controller for regulating the magnitude of a process variable comprising, a computer analog of the process, a signal source for producing a plurality of representative process input signals, first switch means when actuated connecting said computer analog to be reset to the process, second switch means when actuated connecting said signal source to said computer analog, a process regulator, third switch means when actuated connecting said computer analog to said process regulator, and a sequentially actuated timing means connected to actuate said first, second and third switch means in the order named.

18. A predicting controller for regulating the magnitude of a process variable comprising, a computer analog of the process, a signal source for producing a plurality of representative process input signals, first switch means when actuated connecting said computer analog to be reset to the process, second switch means when actuated connecting said signal source to said computer analog, a process regulator, third switch means when actuated connecting said computer analog to said process regulator, a signal comparator connected to the process, said signal comparator and said second switch means preselecting the input signal to said computer analog, and a sequentially actuated timing means connected to actuate said first, second, and third switch means in the order named.

19. A predicting controller for regulating the magnitude of a process variable comprising, a computer analog of the process, a signal source for producing a plurality of representative process input signals, first switch means when actuated connecting said computer analog to be reset to the process, second switch means when actuated connecting said signal source to said computer analog, a process regulator, third switch means when actuated connecting said computer analog to said process regulator, a signal comparator connected to the process, said signal comparator and said second switch means preselecting the input signal to said computer analog, a sequentially actuated timing means connected to actuate said first, second, and third switch means in the order named, and a process input memory means connected to said regulator to hold the input to said regulator for a predetermined period.

20. A predicting controller for regulating the magnitude of a process variable comprising, a computer analog of the process, a signal source for producing a plurality of representative process input signals, first switch means when actuated connecting said computer analog to be reset to the process, second switch means when actuated connecting said signal source to said computer analog, a process regulator, third switch means when actuated connecting said computer analog to said process regulator, a signal comparator connected to the process, said signal comparator and said second switch means preselecting the input signal to said computer analog, a sequentially actuated timing means connected to actuate said first, second, and third switch means in the order named, a process input memory means connected to said regulator to hold the input to said regulator at a fixed magnitude for a preselected time, and means including said timing means periodically connecting said computer analog output in controlling relation to said regulator.

21. A controller for regulating the magnitude of a variable comprising a computer analog of the process, a multiple signal input source, a process variable-set point signal comparator, timing means, means including said timing means and said signal comparator for connecting said input signal source to said analog and varying the input to said analog from a simulated process acceleration input signal to a simulated process deceleration input signal, an analog-set point signal comparator connected to the output of said analog, and a process controller connected to the output of said analog signal comparator.

22. A controller for regulating the magnitude of a variable comprising a computer analog of the process, a multiple signal input source, a process variable-set point signal comparator, timing means, means including said timing means and said signal comparator for connecting said input signal source to said analog and varying the input to said analog from a simulated process acceleration input signal to a simulated process deceleration input signal, a second analog-set point signal comparator, said second signal comparator having a first output when the analog signal deviates from the set point in a first direction and a second output when the analog signal deviates from the set point in a second direction, a process controller connected to said analog to be controlled thereby when there is said first output, a second computer analog of the process, means connecting said second computer analog to said second signal comparator so that when said second comparator has said second output said second analog will have an input from said signal input source, means including said timing means and said second comparator for applying a simulated process deceleration pulse and a simulated process constant velocity pulse to said analog, a third analog-set point signal comparator connected to said second analog, and means connecting said last named signal comparator in controlling relation to said process controller.

23. Apparatus for regulating the magnitude of a process variable comprising an output variable controller having three control positions, a correct input position, a minimum input position and a maximum input position, a measured variable-set point signal comparator supplied with a set point signal, a predicting computer connected to be controlled by said signal comparator, and means connecting said predicting computer to actuate said output variable controller to any one of its three positions when said signal comparator indicates a deviation of the measured variable above or below the set point, or indicates equality between the measured variable and the set point.

24. Apparatus for regulating the magnitude of a process variable comprising an output variable controller having three control positions, a correct input position, a minimum input position and a maximum input position, a measured variable-set point signal comparator supplied with a set point signal, a predicting computer comprising an analog of the process having a time constant which is less than that of the process, means including said signal comparator connecting said analog to a signal source, means including timing means connected to said signal source to apply to said analog signals representative of the three output positions of said variable controller, and means connecting said predicting computer to actuate said output variable controller to any one of its three positions when said signal comparator indicates a deviation of the measured variable above or below the set point, or indicates equality between the measured variable and the set point.

25. Apparatus for regulating the magnitude of a process variable comprising an output variable controller having three control positions, a correct input position, a minimum input position and a maximum input position, a measured variable-set point signal comparator supplied with a set point signal, a predicting computer connected to be controlled by said signal comparator, and means connecting said predicting computer to actuate said output variable controller to any one of its three positions when said signal comparator indicates a deviation of the measured variable above or below the set point, and circuit means connecting said signal comparator directly in controlling relation to said output variable controller when the measured variable is equal to the set point signal.

26. In combination in a predicting controller for a process, a plurality of predicting analogs, a master analog, means continuously monitoring the measured process and resetting the master analog signals to that of the process, and periodically actuated switch means connecting said predicting analogs to said master analog so that said predicting analogs are reset to the condition of the master analog.

27. A controller for regulating the magnitude of a process variable comprising a measured variable-set point signal comparator supplied with a set point signal, first and second predictor analogs of the process, first and second analog output-set point signal comparators supplied with set point signals and connected to the outputs of said first and second predictor analogs respectively, means including said measured variable-set point signal comparator connecting a simulated process signal source to said first or said second analog in accordance with the deviation of said measured variable from the set point, and a process controller connected to be controlled by said first or said second analog output-set point signal comparators.

28. A controller for regulating the magnitude of a process variable comprising a measured variable-set point signal comparator supplied with a set point signal, first and second predictor analogs of the process, first and second analog output-set point signal comparators supplied with set point signals and connected to the outputs of said first and second predictor analogs respectively, means including said measured variable-set point signal comparator connecting a simulated process signal source to said first or said second analog in accordance with the deviation of said measured variable from the set point, means including the signal comparator on the output of the one analog connected to said signal source connecting the other analog to said signal source, and a process controller connected to be controlled by the signal comparator on the output of the other of said analogs.

29. In a predicting controller for the regulation of the magnitude of a process variable, the combination comprising, a predicting analog of the process, means periodically connecting said analog to the process to be reset thereto, a simulated process input signal source, means periodically connecting said source to said analog, a set point signal comparator supplied with a set point signal and connected to said analog to indicate the deviation of the analog output with respect to the set point, a set point crossing memory circuit connected to said signal comparator, and a process controller connected to be controlled by said signal comparator and said set point crossing memory circuit.

30. A process controller comprising a predicting analog, switching means for selectively applying input signals to the analog representative of predetermined values of process input, a process controller, signal comparison means having a preselected input set point connected to the output of said predicting analog, said signal comparison means having a pair of output circuits, one circuit of which is actuated when the analog output during a predicting period is less than the preselected set point value and the other circuit of which is actuated when the analog output exceeds the preselected set point value, a set point crossing memory circuit connected to be actuated by said other output circuit, and means connecting said set point crossing memory circuit or said one output to said process controller to regulate the input to the regulated process in accordance with whether or not the output signal from the analog has or has not crossed the set point signal.

31. A process controller comprising a predicting analog, switching means for selectively applying input signals to the analog representative of predetermined values of process input, a process controller, signal comparison means having a preselected input set point connected to the outputs of said predicting analog, said signal comparison means having a pair of output circuits, one circuit of which is actuated when the analog output during a predicting period is less than the preselected set point value and the other circuit of which is actuated when the analog output exceeds the preselected set point value, a set point crossing memory circuit connected to be actuated by said other output circuit, means connecting said one circuit or said set point crossing memory circuit to regulate the output of said process controller, and means actuated at the end of each predicting period deenergizing said set point crossing memory circuit.

32. Apparatus as defined in claim 31 wherein said set point crossing memory circuit is effective to regulate the application of an input signal to a second predicting analog whose output is connected to said process controller.

33. In a process controller, the combination comprising, a process variable monitor having a process variable output signal indicative of the process variable magnitude, predicting analog means connected to superimpose on said process variable signal a predicting signal, means connected to be responsive to the output of said analog means and having a first output circuit actuated when the superimposed signal on said process signal does not cross a preselected set point signal, and a second output circuit actuated when said process signal does cross said predetermined set point signal, a process regulator having a plurality of control positions, and means connecting said first and second output circuits to said process regulator to variably select the desired control position of said process regulator.

34. In a process controller, the combination comprising, a process variable monitor having a process variable output signal indicative of the process variable magnitude, predicting analog means connected to superimpose on said process variable signal a predicting signal, means connected to be responsive to the output of said analog means and having a first output circuit actuated when the superimposed signal on said process signal does not cross a preselected set point signal, and a second output circuit actuated when said process signal does cross said predetermined set point signal, a second predicting analog, means including said second output circuit connecting said second predicting analog to produce a signal superimposed on said process variable, means connected to be responsive to the output of said second analog and having a third output circuit actuated when said second analog has an output signal which crosses said predetermined set point, and a fourth output circuit actuated when said second analog has an output signal that does not cross said predetermined set point, and means connecting said first, third and fourth output circuits to said process regulator to variably select the desired control position of said regulator.

35. In a process controller, the combination comprising, a process variable monitor having a process variable output signal indicative of the process variable magnitude, predicting analog means connected to superimpose on said process variable signal a predicting signal, means connected to be responsive to the output of said analog means and having a first output circuit actuated when the superimposed signal on said process signal does not cross a preselected set point signal and a second output circuit actuated when said process signal does cross said predetermined set point signal, a second predicting analog, means including said second output circuit connecting said second predicting analog to produce a signal superimposed on said process variable, means connected to be responsive to the output of said second analog and having a third output circuit actuated when said second analog has an output signal which crosses said predetermined set point and a fourth output circuit actuated when said second analog has an output signal that does not cross said predetermined set point, means connected to render said first named and second analogs periodically effective to superimpose a signal on said process variable signal, and an analog output memory means connected to said process regulator and to said first, third, and fourth output circuits to actuate said process regulator in accordance with which output circuit is actuated during the period when a further prediction is being made.

References Cited in the file of this patent

UNITED STATES PATENTS

| | | |
|---|---|---|
| 2,503,213 | Philbrick | Apr. 4, 1950 |
| 2,519,615 | Wannamaker | Aug. 22, 1950 |
| 2,712,414 | Ziebolz et al. | July 5, 1955 |